(12) United States Patent
Giacopelli et al.

(10) Patent No.: US 6,973,165 B2
(45) Date of Patent: Dec. 6, 2005

(54) METHOD AND APPARATUS FOR IMPROVING PREMISES-LINE CALL AVAILABILIY IN AN ALARM SYSTEM

(75) Inventors: Daniel Giacopelli, Deer Park, NY (US); Jeffrey M. Hickey, Patchogue, NY (US)

(73) Assignee: Telular Corp., Vernon Hills, IL (US)

( * ) Notice: Subject to any disclaimer, the term of this patent is extended or adjusted under 35 U.S.C. 154(b) by 415 days.

(21) Appl. No.: 10/298,479

(22) Filed: Nov. 18, 2002

(65) Prior Publication Data

US 2003/0128115 A1    Jul. 10, 2003

Related U.S. Application Data

(60) Provisional application No. 60/347,576, filed on Jan. 10, 2002.

(51) Int. Cl.[7] ............................................. H04M 11/04
(52) U.S. Cl. ............................. 379/37; 379/42; 379/45
(58) Field of Search ............................. 379/37–44, 45, 379/48, 90.01, 93.05, 93.09, 100.16, 102.02; 340/825.56, 506, 510

(56) References Cited

U.S. PATENT DOCUMENTS

| | | | |
|---|---|---|---|
| 4,718,079 A | | 1/1988 | Rabito ........................... 379/2 |
| 4,821,312 A | * | 4/1989 | Horton et al. ........... 379/93.09 |
| 5,131,019 A | | 7/1992 | Sheffer et al. ................ 379/39 |
| 5,187,736 A | * | 2/1993 | Moriizumi ............. 379/100.06 |
| 5,748,706 A | * | 5/1998 | Morgan et al. ............... 379/37 |
| 6,226,357 B1 | * | 5/2001 | Pildner ........................ 379/37 |

* cited by examiner

*Primary Examiner*—Melur Ramakrishnaiah
(74) *Attorney, Agent, or Firm*—Milton S. Gerstein; Much, Shelist, Freed

(57) ABSTRACT

When an alarm panel needs to transmit alarm data, it seizes the PSTN and disconnects the premises-wiring. If in a call, the user is cut off immediately and it appears to the user that the connection to the PSTN has been lost. If trying to place a call, the user also perceives that the connection to the PSTN is lost. The present invention provides tonal signals to the user to indicate that the PSTN line is in use by the alarm panel and also notifies the user when the PSTN connection is available for use.

11 Claims, 4 Drawing Sheets

US 6,973,165 B2

Figure 1:
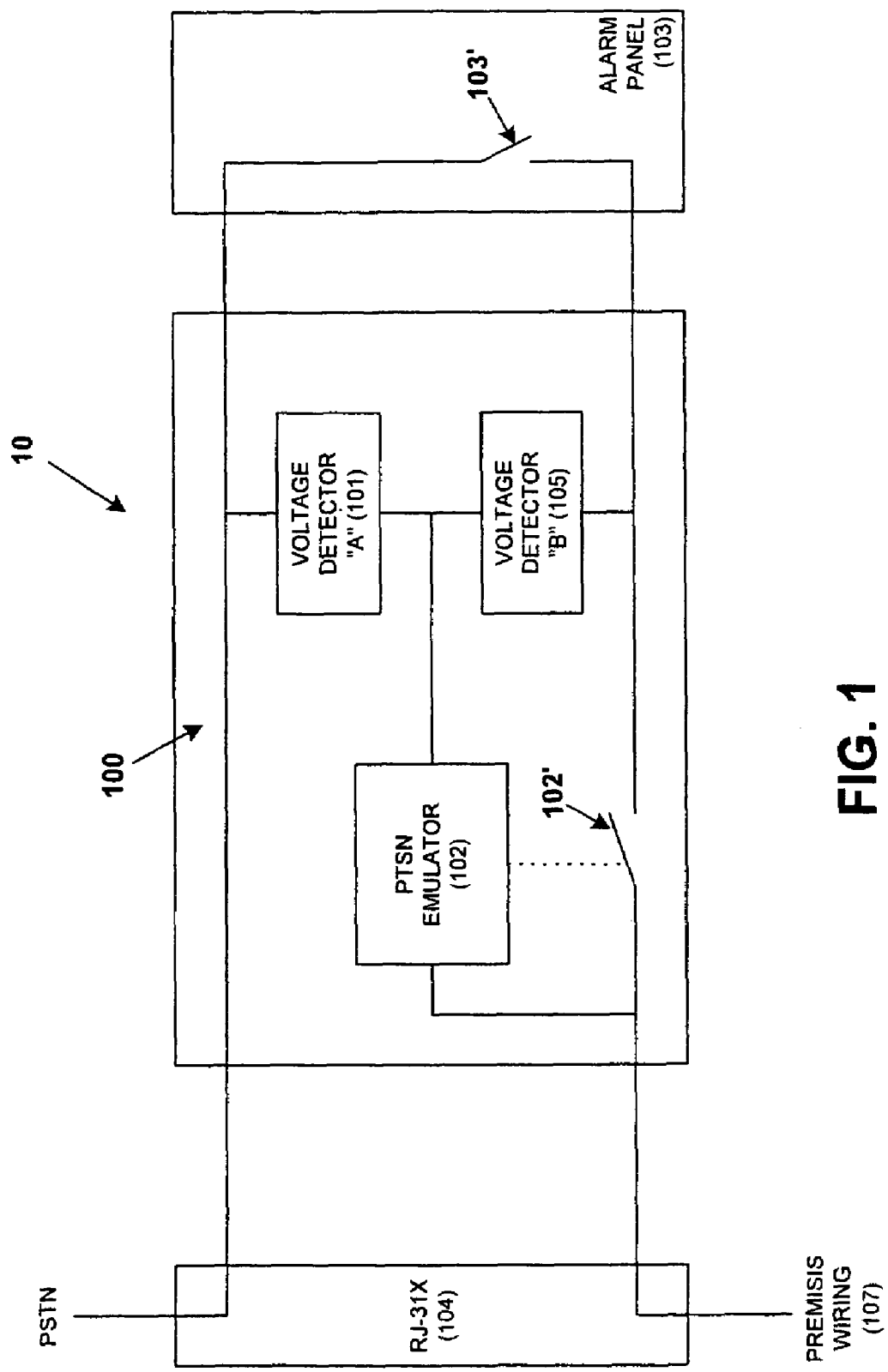

METHOD AND APPARATUS FOR IMPROVING PREMISES-LINE CALL AVAILABILIY IN AN ALARM SYSTEM

This appln. claims the benefit of 60/347,576 filed on Jan. 10, 2002

BACKGROUND OF THE INVENTION

The present invention is directed to a wired, alarm control-panel system for protecting a premises site, such that upon the system's sensing an alarm condition, connection between the premises-wiring and the public switched telephone network, or PSTN, is broken or terminated, and which connection to the PSTN is thereby seized by the alarm control-panel system in order to transmit to, and receive alarm data from, an alarm central station, or the like, over the PSTN. When this alarm condition occurs, any telephone device attached to the premises-wiring is rendered inoperable for the period that the alarm-panel's PSTN-seizure is in effect. Such seizure of the PSTN and the isolation of the premises-wiring is a considerable problem, especially in time of an emergency. The occupant of the premises, or client, does not know if the disconnected line is due to an alarm seizure by the alarm control-panel system, or due to a break in the connection to the PSTN that was caused by the emergency. In addition, the client does not know when the premises-wiring has been reconnected to the PSTN, so that a telephone call may then be made.

Examples of conventional alarm control-panel systems that seize control of the PSTN during an alarm condition for reporting the alarm condition to a central monitoring station, or the like, which seizure also cuts off the premises-wiring from connection to the PSTN is shown in U.S. Pat. No. 4,718,079—Rabito, and U.S. Pat. No. 5,131,019—Sheffer, et al.

It would be highly advantageous to provide an alarm control-panel system that monitors a premises for alarm conditions which will notify, warn, or otherwise indicate to the occupant or client of the protected premises when the alarm panel of the alarm control-panel system has seized control of the PSTN-connection, and also, when the alarm panel has relinquished seizure thereof. This would permit a more reliable use of the premises' telephone devices to make and receive calls, especially in emergency conditions.

SUMMARY OF THE INVENTION

It is a primary objective of the present invention to provide a signaling system for use with a wired, alarm control-panel systems for protecting a premises site, such that upon the existence of an alarm condition and the subsequent seizure of the PSTN by the alarm control-panel system, the signaling system of the invention signals to the occupant, or client, of the premises such line-seizure of the PSTN, whereby the client will be thus informed.

It is also a primary objective of the present invention to provide such a signaling system for use with a wired, alarm control-panel system for protecting a premises site, such that the system of the present invention provides different and unique signaling tones or messaging to the premises-wiring depending upon the state of the alarm control panel and the state of the telephone devices connected to the premises-wiring.

Toward these and other ends, the signaling system of the present invention for use with a wired, alarm control-panel system for protecting a premises site is interposed between the protected premises-wiring and the alarm control-panel system, and consists of voltage detectors for monitoring and detecting the status of the premises-wiring connected to the PSTN. The system of the invention also has a PSTN emulator that, during the activated state of the alarm control-panel system, when the PSTN line is seized thereby, will provide central office functionality to the premises-wiring, and, therefore, to the telephone devices connected thereto, in order to provide signal-messaging to the telephone devices during and after the activation of the alarm control-panel system, so that the premises' client is completely informed as to the status of the alarm control-panel system and, also therefore, to the status of the connection to the PSTN.

BRIEF DESCRIPTION OF THE INVENTION

Figure 2:
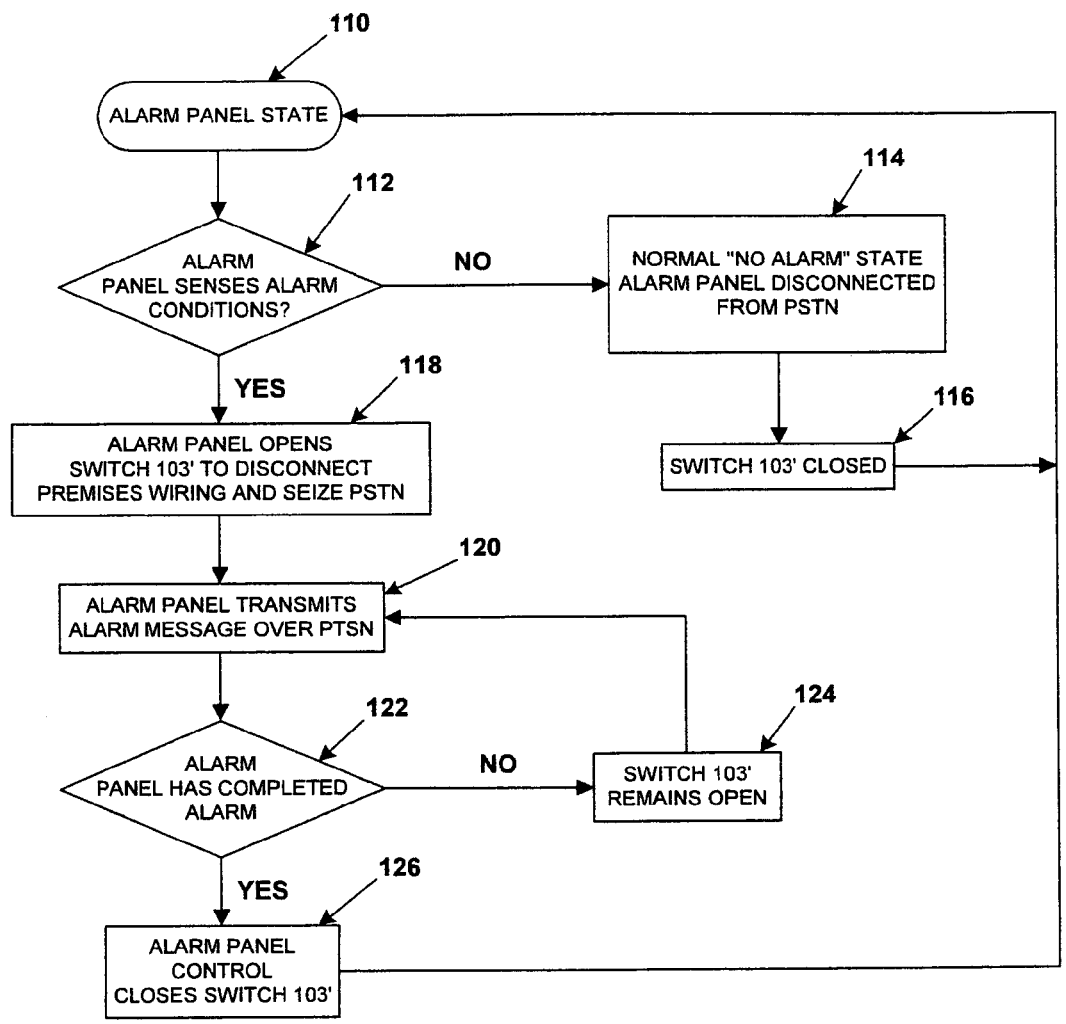
Figure 3A:
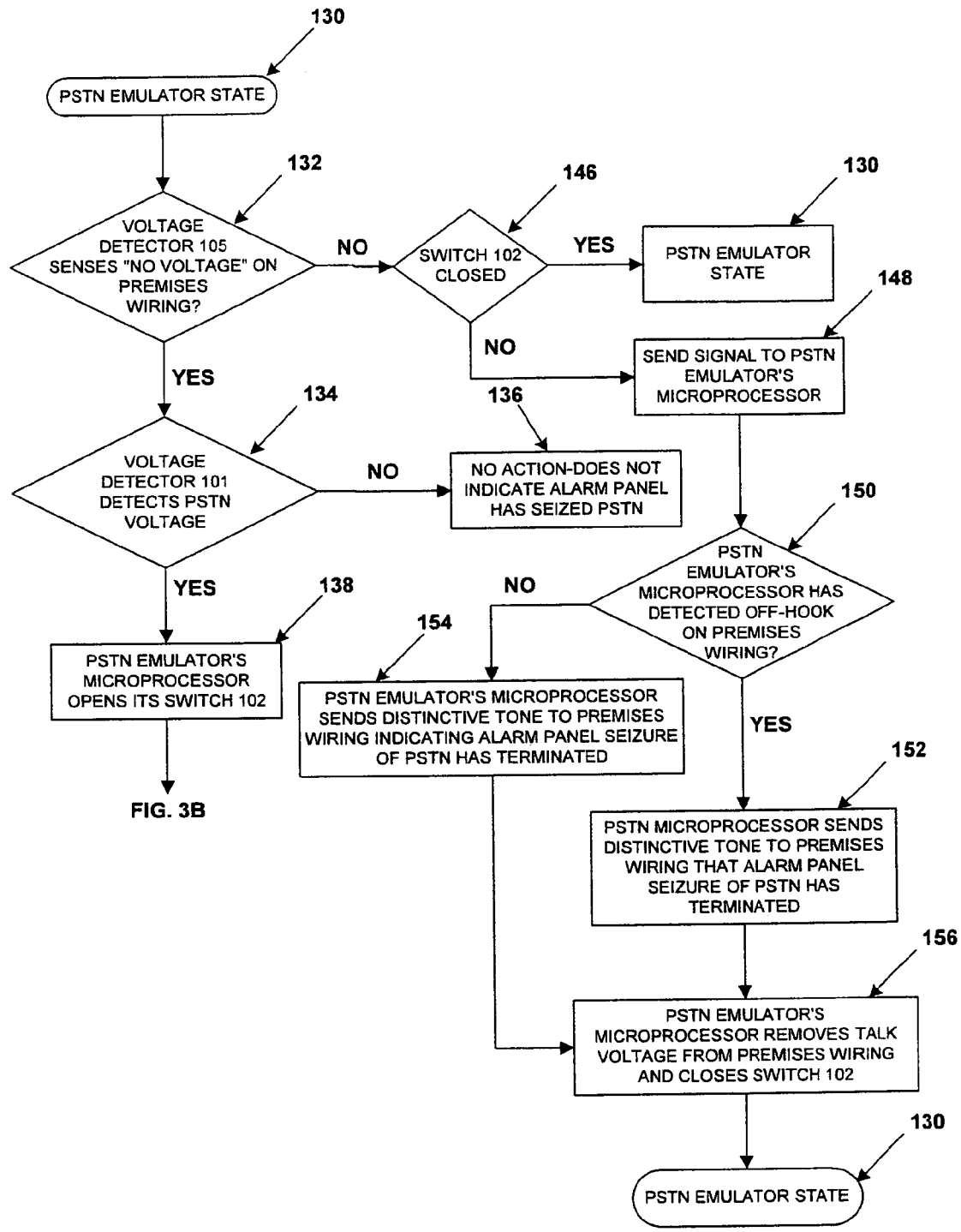

The invention will be more understood with reference to the accompanying, wherein:

FIG. 1 is a block diagram of the system of the invention in a condition when the alarm panel has seized control of the PSTN connection, and signaling is produced to a user that such has occurred, and which, upon abandoning of such seizure, will also send out signaling to a user indicating thus;

FIG. 2 is a flow chart showing the state of the alarm-panel control system before, during and after an alarm conditional; and FIG. 3 is a flow chart showing the state of the PSTN-emulator of the system of the present invention used in conjunction with the alarm-panel control system before, during and after an alarm condition for indicating to the client when the premises-wiring has been disconnected from the PSTN during line-seizure by the alarm control panel, and when such connection has been restored.

DETAILED DESCRIPTION OF THE INVENTION

Referring now to the drawings in greater detail, the total alarm system for a protected site is indicated generally by reference numeral 10, which system 10 consists of a conventional alarm control-panel apparatus 103, and the signaling system 100 of the present invention. The signaling system 100 of the present invention is interposed, or electrically coupled, between the alarm control-panel system 103 and a conventional RJ-31X interconnection 104 connecting either premises-wiring 107 or alarm control-panel 103 to the PSTN via control-panel switch 103'.

The signaling system 100 of the present invention consists of three primary components: A voltage detector 101 that monitors the condition of the PSTN line 109; a voltage detector 105 that monitors the condition of the premises-wiring 107; and a PSTN emulator 102, with dedicated microprocessor, that provides the functionality of the PSTN. PSTN emulator preferably provides the following functions: Talk voltage to the premises-wiring, dial tone thereto, ringing thereto, and off-hook detection of devices attached to the premises-wiring. Also included is a switch 102' that allows the premises-wiring to be isolated from alarm control-panel 103. This switch is in a normally-closed state when no alarm condition is present.

When the alarm panel 103 is in its normal "no alarm" state, the switch 103' in the alarm panel is closed, which allows the premises-wiring to be connected to the PSTN. When the alarm panel 103 senses an alarm condition, it opens the switch 103' in order to disconnect the premises-wiring from the PSTN, in order to seize the PSTN line. Once the PSTN line has been seized, the alarm panel 103 goes off-hook in order to transmit alarm data to a central monitoring station. At this time, voltage detector 105 detects no voltage on the premises-wiring 107, and sends a signal thereof to the microprocessor of the PSTN emulator 102. The PSTN emulator then checks the status of voltage detector 101 in order to determine if the alarm panel 103 has seized the PSTN line. If voltage detector 101 does not detect voltage on the PSTN line, no further actions occur, since such would indicate that the premises-wiring has been disabled for some reason other than seizure of the PSTN line by the alarm panel 103. If voltage detector 101 does detect a voltage, such indicates that the alarm panel has seized the PSTN line. The microprocessor of the PSTN emulator 102 will then cause switch 102' to open, thereby preventing accidental application of the talk battery voltage from the PSTN line to the premises-wiring and to the PSTN emulator if the alarm panel switch 103' closes unexpectedly, thereby providing protection thereto. With switch 102' open, the microprocessor of the PSTN emulator will cause talk battery voltage to be supplied to the premises-wiring 107. At this juncture, it will monitor the premises-wiring for an off-hook condition by one of the telephone devices connected to the premises-wiring. If an off-hook condition is detected, the microprocessor of the PSTN emulator will cause the application of distinctive signaling, such as a warbling dial tone or a series of individual tones, to the premises-wiring, and, therefore, to any telephone device connected thereto. These distinctive tones alert the user of the telephone device that the alarm panel has seized control of the PSTN line, and that an alarm state exists at his premises, and that outgoing or incoming calls are not possible at that time. It is, of course, to be understood that the specific distinctive tone-signaling that is generated may be changed as will be apparent to one of ordinary skill in the art.

When voltage detector 105 again detects voltage on the wiring 108 from the alarm panel, it sends a signal to the microprocessor of the PSTN Emulator 102. The microprocessor of the PSTN emulator will then cause a different distinctive signal to be sent to the premises-wiring. The type of signal will depend if a telephone device on the premises-wiring is on-hook or off-hook. For example, if a telephone device is detected as off-hook at this time, different dial-tone signaling is generated. If on-hook, a distinctive ring signal will be generated. It is, of course, to be understood that the specific distinctive tone-signaling that is generated for each state may be changed as will be apparent to one of ordinary skill in the art. This signal will notify the user that the alarm panel 103 has relinquished its control of the PSTN line 109. After generating the distinctive signal, the PSTN emulator will remove the talk battery voltage and close switch 102'. The PSTN wiring is now connected to the premises-wiring, and the telephone devices connected can operate in a normal fashion.

Referring now to FIG. 2, there is shown the flow chart for the alarm-panel process (block 110). The microprocessor of the alarm control-panel apparatus continuously monitors the protected site or premises for an alarm state (block 112). If no alarm condition is sensed, the alarm control-panel apparatus is disconnected from the PSTN (block 114), by switch 103' being kept closed (block 116), with switch 102' of the PSTN emulator also being kept closed by the PSTN emulator (see FIG. 3). If an alarm-condition is detected, then the microprocessor of the alarm control-panel apparatus opens switch 103' in order to disconnect the premises-wiring from the PSTN in order to seize the PSTN line (block 118), and then transmits the alarm-message over the PSTN (block 120). The software associated with the microprocessor of the alarm control-panel apparatus then checks to see the alarm-message transmission has been completed (block 122). If "NO", then switch 103' is retained in its open state (block 124). If "YES", then the software causes the closure of the switch 103' to return the PSTN connection to the premises-wiring (block 126), with the system returning to its alarm-condition monitoring mode (block 110).

Figure 3B:
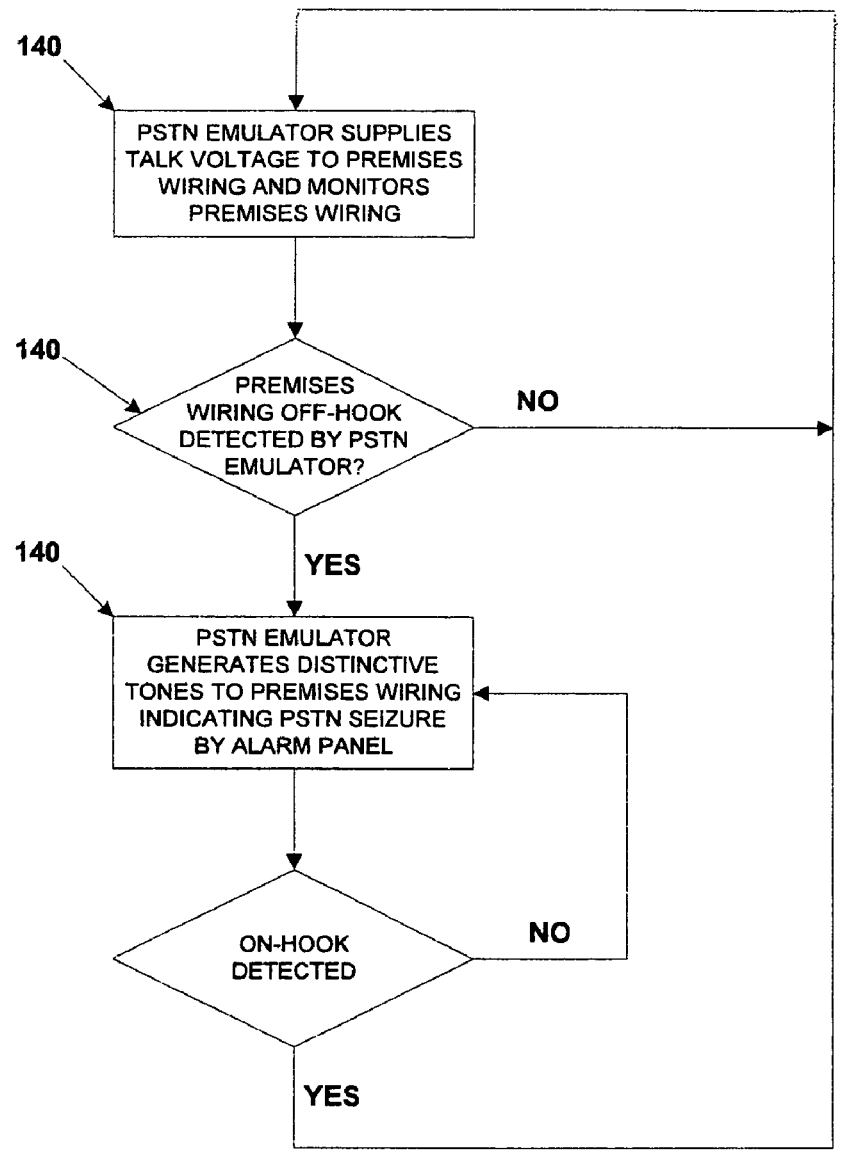

Referring now to FIG. 3, there is shown the flow chart for the PSTN emulator apparatus (block 130). The microprocessor continuously monitors the state of the voltage detector 105 (block 132) in order to determine if the premises-wiring is connected to PSTN. If no voltage is detected, which is a "YES" to decision block 132, then the software for the microprocessor of the PSTN emulator first causes the checking of the condition of the voltage detector 101 (block 134). If no voltage is detected, which is a "NO" to decision block 134, then no action is taken since such indicates that the alarm panel has not seized the PSTN line, and is not transmitting alarm-messages to a central station (block 136). This would indicate that there is line-trouble associated with the PSTN. Alternatively, for those alarm control panels that have as one alarm-condition input the outage of the PSTN line as determined by a line-fault detector, which may occur due a line-cut by a burglar, the alarm control panel will send out its alarm-message data via a back-up radio link, as in well-known in the art. If PSTN voltage is detected by the voltage detector 101, which is a "YES" to decision block 134, then the microprocessor of the PSTN emulator will open switch 102', in order to isolate the premises-wiring and the voltage-sensitive hardware of the PSTN emulator (block 138) as described above. At this point, the microprocessor of the PSTN emulator will control the hardware components thereof, and initiate talk-voltage to the premises-wiring (block 140 FIG. 3B), so that the telephone devices connected to the premises-wiring are activated. As long as the PSTN line remains disconnected from the premises-wiring, this talk-voltage is supplied to the premises-wiring. The microprocessor of the PSTN emulator also control the hardware components thereof associated with the generation of one or more distinct tone-signaling for the telephone devices connected to the premises-wiring. These one or more distinct tone-signaling for the telephone devices are used to signal the status of the alarm control panel's connection to the PSTN. The first distinct tone-signaling is for the off-hook state of the telephone devices connected to the premises-wiring. If, while the alarm control panel is connected to the PSTN, a telephone device goes off-hook (which is "YES" to the decision block 142), then the microprocessor will detect such and cause the generation of these first distinct tones (block 144), 50 that the user, or client, will be informed that his premises is in an "alarm-present" state.

After the alarm control panel has completed transmitting its alarm-message data, the switch 103' thereof will again be closed, in order to reconnect the premises-wiring to the PSTN, as described above with reference to FIG. 2. This state causes the voltage detector 105 to again sense voltage ("NO" to decision block 132—FIG. 3A). The software determines if the PSTN emulator switch 102' is open or closed (block 146). If the answer is "NO", which is state after the alarm control panel has completed alarm-message transmission and has terminated its seizure of the PSTN line, then the microprocessor of the PSTN emulator receives the signal (block 148), and then is ready to generate appropriate tone-signaling indicative of the state of end of PSTN line-seizure by the alarm control panel. The software then determines if a telephone device connected to the premises-wiring is off-hook, or not (decision block 150). If the answer "YES", then a distinctive tone will be generated, which is different from the alarm-panel line-seizure tones generated during block 144, in order to indicate to the client at the premises that the alarm-transmission has terminated, and that the premises-wiring is about to be reconnected to the PSTN line (block 152). If the answer to decision block 150 is "NO", meaning that no off-hook was detected, then the microprocessor will cause different distinct tones to be generated (block 154), such as distinctive ring tones, in order to indicate the client at the premises that the PSTN line seizure has terminated. After the line-seizure termination tones have been generated, the microprocessor causes the switch 102' to return to its normally closed position, whereupon the premises-wiring is again connected to the PSTN (block 156), whereupon the PSTN emulator system returns to its steady-state status ("YES" to decision block 146).

The hardware used by the PSTN emulator 100 for providing central office (CO) functions to the premises-wiring is well-known and conventional, and includes a talk-voltage battery supply, ring-tone generators, a dial-tone generator, and the like, depending upon which distinctive tone-signaling is to be associated with the above-described, unique events for indicating the status of PSTN line-seizure or the lack thereof. Such hardware for providing CO functions to a premises-wiring is disclosed, for example, in commonly-owned U.S. Pat. Nos.: 5,715,296; 5,812,643; and 5,946,616.

While a specific embodiment of the invention has been shown and described, it is to be understood that numerous changes and modifications may be made therein without departing from the scope and spirit of the invention as set forth in the appended claims.

What is claimed is:

1. In an alarm reporting apparatus for monitoring a premises for an alarm-condition and for reporting the alarm-condition to an alarm station, said alarm reporting apparatus comprising sensing means for sensing an alarm-condition, reporting means for reporting the alarm-condition to an alarm station via the PSTN, and seizing means for seizing control of the PSTN line at the premises and for disconnecting the premises-wiring from its connection to the PSTN line, the improvement comprising:
   Signal-generating means operatively associated with said alarm reporting apparatus for generating signals to the premises-wiring for indicating the status of the connection of said alarm reporting apparatus to the PSTN;
   said signal-generating means comprising voltage-detection means for detecting a voltage on the premises-wiring, and means for supplying central-office functions to the premises-wiring when said voltage-detection means detects no voltage on said premises-wiring; said means for supplying central-office functions to the premises-wiring comprising tone-generating means for generating a distinct signal to the premises-wiring and voltage-generating means for generating voltage to the premises-wiring when said voltage-detection means detects no voltage on the premises-wiring.

2. The improvement according to claim 1, wherein said tone-generating means comprises means for generating at least one tone-signal from at least one of the following: Dial-tone signal, ring-tone signal, busy-tone signal.

3. The improvement according to claim 1, wherein said tone-generating means for generating a distinct signal to the premises-wiring comprises first means for generating a first distinct signal, and second means for generating a second distinct signal different than said first distinct signal; said first distinct signal indicating the seizure of the PSTN by said alarm monitoring apparatus, and said second distinct signal indicating release of the seizure of the PSTN by said alarm monitoring apparatus.

4. The improvement according to claim 1, wherein said signal-generating means further comprises another voltage-detection means for detecting voltage on the PSTN, whereby when both said voltage detection means detect no voltage, said voltage-generating means for generating voltage to the premises-wiring does not supply said voltage to the premises-wiring.

5. The improvement according to claim 1, in combination with premises-wiring of a protected site at which said alarm monitoring apparatus is located, and at least one telephone device connected to said premises-wiring;
   said signal-generating means being operatively connected between said alarm reporting apparatus and said premises-wiring.

6. A signal generating device for generating distinct signals to premises-wiring of a premises protected by an alarm reporting apparatus, comprising:
   Signal-generating means operatively for generating signals to the premises-wiring for indicating the status of the connection of the alarm reporting apparatus to the PSTN line at the protected premises;
   said signal-generating means comprising voltage-detection means for detecting a voltage on the premises-wiring, and means for supplying central-office functions to the premises-wiring when said voltage-detection means detects no voltage on said premises-wiring;
   said means for supplying central-office functions to the premises-wiring comprising voltage-generating means for generating voltage to the premises-wiring when said voltage-detection means detects no voltage on the premises-wiring, and tone generating means for generating a distinct signal to the premises-wiring when said voltage-detection means detects no voltage on the premises-wiring, whereby a telephone device connected to the premises-wiring may detect such distinct signal for indicating such status to a user.

7. The signal generating device for generating distinct signals to premises-wiring of a premises protected by an alarm reporting apparatus according to claim 6, wherein said tone-generating means for generating a distinct signal to the premises-wiring comprises first means for generating a first distinct signal, and second means for generating a second distinct signal different than said first distinct tone; said first distinct signal indicating the seizure of the PSTN by said alarm monitoring apparatus, and said second distinct signal indicating release of the seizure of the PSTN by said alarm monitoring apparatus.

8. The signal generating device for generating distinct signals to premises-wiring of a premises protected by an alarm reporting apparatus according to claim 7, wherein said tone-generating means for generating a distinct signal to the premises-wiring comprises third means for generating a third distinct signal different than said first and second distinct signals; said second distinct signal indicating the release of the PSTN by said alarm monitoring apparatus when a telephone device connected to the premises-wiring is off-hook, and said third distinct signal indicating release of the seizure of the PSTN by said alarm monitoring apparatus when a telephone device connected to the premises-wiring is on-hook.

9. The signal generating device for generating distinct signals to premises-wiring of a premises protected by an alarm reporting apparatus according to claim 8, wherein said signal-generating means further comprises switch means for connecting and disconnecting the premises-wiring with the alarm reporting apparatus, said switch disconnecting the premises-wiring with the alarm monitoring apparatus when said voltage-detection means detects no voltage on the premises-wiring; and said signal-generating means further comprising another voltage-detection means for detecting voltage on the PSTN, whereby when both said voltage detection means detect no voltage, said voltage-generating means for generating voltage to the premises-wiring does not supply said voltage to the premises-wiring.

10. In an alarm reporting apparatus for monitoring a premises for an alarm-condition and for reporting the alarm-condition to an alarm station, said alarm reporting apparatus comprising sensing means for sensing an alarm-condition, reporting means for reporting the alarm-condition to an alarm station via the PSTN, and seizing means for seizing control of the PSTN line at the premises and for disconnecting the premises-wiring from its connection to the PSTN line, the improvement comprising:

Signal-generating means operatively associated with said alarm reporting apparatus for generating signals to the premises-wiring for indicating the status of the connection of said alarm reporting apparatus to the PSTN;

said signal-generating means comprising voltage-detection means for detecting a voltage on the premises-wiring, and means for supplying central-office functions to the premises-wiring when said voltage-detection means detects no voltage on said premises-wiring; said means for supplying central-office functions to the premises-wiring comprising tone-generating means for generating a distinct signal to the premises-wiring, whereby a telephone device connected to the premises-wiring may detect such distinct signal for indicating such status to a user;

said signal-generating means further comprising switch means for connecting and disconnecting the premises-wiring with said alarm reporting apparatus, said switch disconnecting said premises-wiring with said alarm monitoring apparatus when said voltage-detection means detects no voltage on the premises-wiring.

11. A method of signaling to a telephone device coupled to a premises-wiring capable of being connected to a PSTN when an alarm-condition is present at a premises, comprising:

(a) supplying voltage to the premises-wiring when an alarm monitoring apparatus has seized connection to the PSTN line of the premises and has disconnected the premises-wiring therefrom;

(b) generating at least one distinct tone signal to the telephone device coupled to the premises-wiring indicative of the status of the seizure of the connection to the PSTN line by the alarm monitoring apparatus, said step (b) comprising;

(c) generating a distinct tone signal indicating the seizure of the PSTN by said alarm monitoring apparatus;

(d) generating a second distinct tone signal indicating release of the seizure of the PSTN by said alarm monitoring apparatus;

(e) reconnecting the premises-wiring to the PSTN line after said step (d); and (f) before said step (e), cutting off the supply of voltage of said step (a).

\* \* \* \* \*

UNITED STATES PATENT AND TRADEMARK OFFICE
CERTIFICATE OF CORRECTION

PATENT NO. : 6,973,165 B2  Page 1 of 1
APPLICATION NO. : 10/298479
DATED : December 6, 2005
INVENTOR(S) : Daniel Giacopelli et al.

It is certified that error appears in the above-identified patent and that said Letters Patent is hereby corrected as shown below:

Column 6:
  Line 22, "operatively" should be deleted.

Column 7:
  Line 4, "switch" should read -- switch means --.

Column 8:
  Line 6, "switch" should read -- switch means --.

Signed and Sealed this

Twenty-second Day of September, 2009

David J. Kappos
*Director of the United States Patent and Trademark Office*